(12) United States Patent
Salvucci

(10) Patent No.: US 11,754,112 B2
(45) Date of Patent: Sep. 12, 2023

(54) LOCKING THREAD FASTENERS

(71) Applicant: Emanuele Salvucci, Rome (IT)

(72) Inventor: Emanuele Salvucci, Rome (IT)

( * ) Notice: Subject to any disclaimer, the term of this patent is extended or adjusted under 35 U.S.C. 154(b) by 0 days.

(21) Appl. No.: 18/000,816

(22) PCT Filed: Jun. 9, 2021

(86) PCT No.: PCT/EP2021/065518
§ 371 (c)(1),
(2) Date: Dec. 5, 2022

(87) PCT Pub. No.: WO2021/250123
PCT Pub. Date: Dec. 16, 2021

(65) Prior Publication Data
US 2023/0193944 A1 Jun. 22, 2023

Related U.S. Application Data

(60) Provisional application No. 63/036,774, filed on Jun. 9, 2020.

(51) Int. Cl.
*F16B 41/00* (2006.01)
*F16B 35/06* (2006.01)

(52) U.S. Cl.
CPC ............ *F16B 41/005* (2013.01); *F16B 35/06* (2013.01); *F16B 41/00* (2013.01)

(58) Field of Classification Search
CPC .......... F16B 23/00; F16B 35/06; F16B 39/10; F16B 39/24; F16B 39/28; F16B 41/00; F16B 41/005; F16B 43/00
(Continued)

(56) References Cited

U.S. PATENT DOCUMENTS 2,479,225 A 8/1949 Gann
5,338,139 A * 8/1994 Swanstrom ........... F16B 41/002
411/910
(Continued)

OTHER PUBLICATIONS

WIPO, PCT Form ISA 210, International Search Report for IA Patent Application Serial No. PCT/EP2021/065518, pp. 6 (dated Sep. 24, 2021).

(Continued)

*Primary Examiner* — Roberta S Delisle
(74) *Attorney, Agent, or Firm* — UltimatEdge IP Law Group, P.C.; Dean G. Stathakis

(57) ABSTRACT

The present specification discloses a locking fastener that includes a first threaded fastener axially positioned within an axial through hole of a second threaded fastener, and captured therein by a rotating joint that permits rotation of the first threaded fastener and the second threaded fastener relative to one another about a common thread axis. In one or more embodiments, the first threaded fastener thread handedness is opposite to the second threaded fastener thread handedness. Additionally disclosed, is a screwdriver tool configured to simultaneously engage and oppositely rotate the first threaded fastener and the second threaded fastener into a mating component having a first mating thread and a second mating thread configured to receive the first threaded fastener and the second threaded fastener, respectively, driven at the same axial advance distance for each turn. Once tightened, the present locking fastener resists loosening and provides a tamper-resistant hold.

20 Claims, 7 Drawing Sheets

(58) Field of Classification Search
USPC ............... 411/337, 352–353, 366.1, 368
See application file for complete search history.

(56) References Cited

U.S. PATENT DOCUMENTS

| | | | | |
|---|---|---|---|---|
| 5,462,395 | A * | 10/1995 | Damm | F16F 1/3732 |
| | | | | 411/107 |
| 6,095,736 | A * | 8/2000 | Miller | F16B 41/002 |
| | | | | 411/352 |
| 6,176,255 | B1 | 1/2001 | Robinson | |
| 6,296,431 | B1 | 10/2001 | Miller | |
| 8,137,041 | B2 * | 3/2012 | Zhou | F16B 5/0241 |
| | | | | 411/353 |
| 10,393,158 | B2 * | 8/2019 | Boedot | F16B 41/002 |

OTHER PUBLICATIONS

WIPO, PCT Form ISA 237, Written Opinion for IA Patent Application Serial No. PCT/EP2021/065518, pp. 9 (dated Sep. 24, 2021).
WIPO, PCT Form IPEA 408, Written Opinion for IA Patent Application Serial No. PCT/EP2021/065518, pp. 8 (dated Feb. 22, 2022).
WIPO, PCT Form IPEA 409, International Preliminary Report on Patentability for IA Patent Application Serial No. PCT/EP2021/065518, pp. 8 (dated Apr. 20, 2022).

* cited by examiner

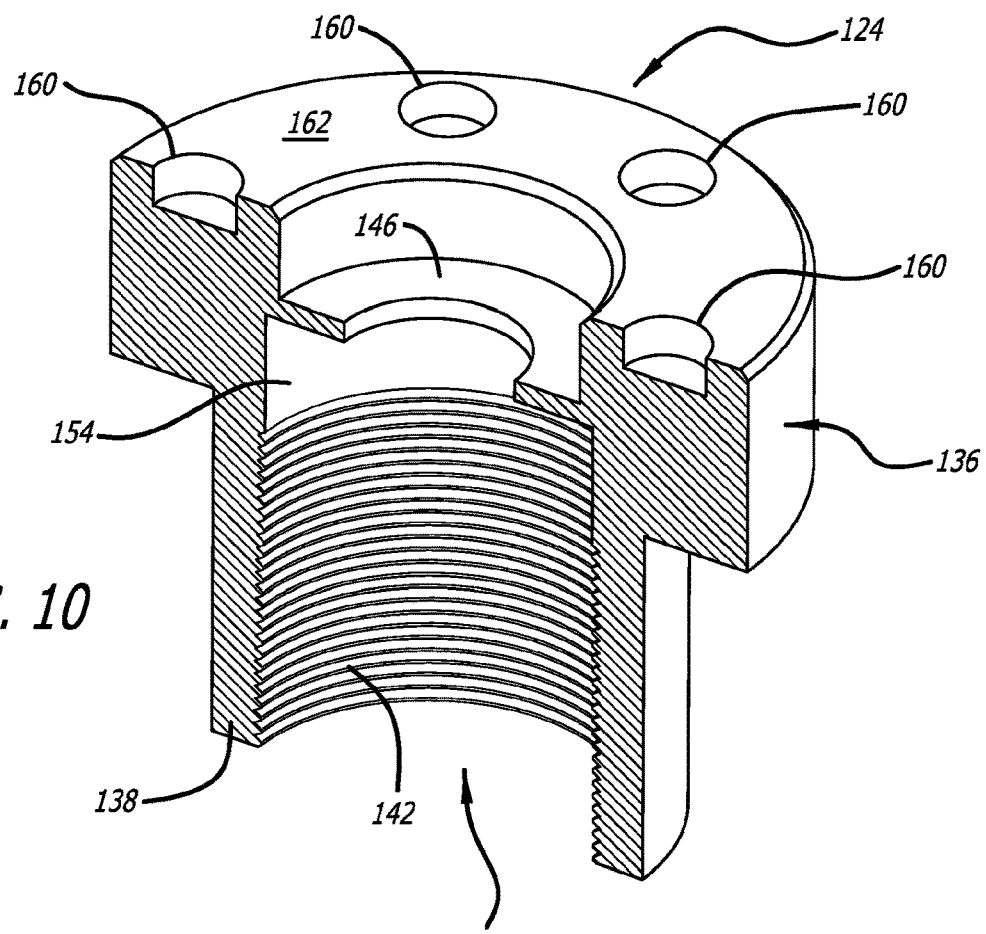
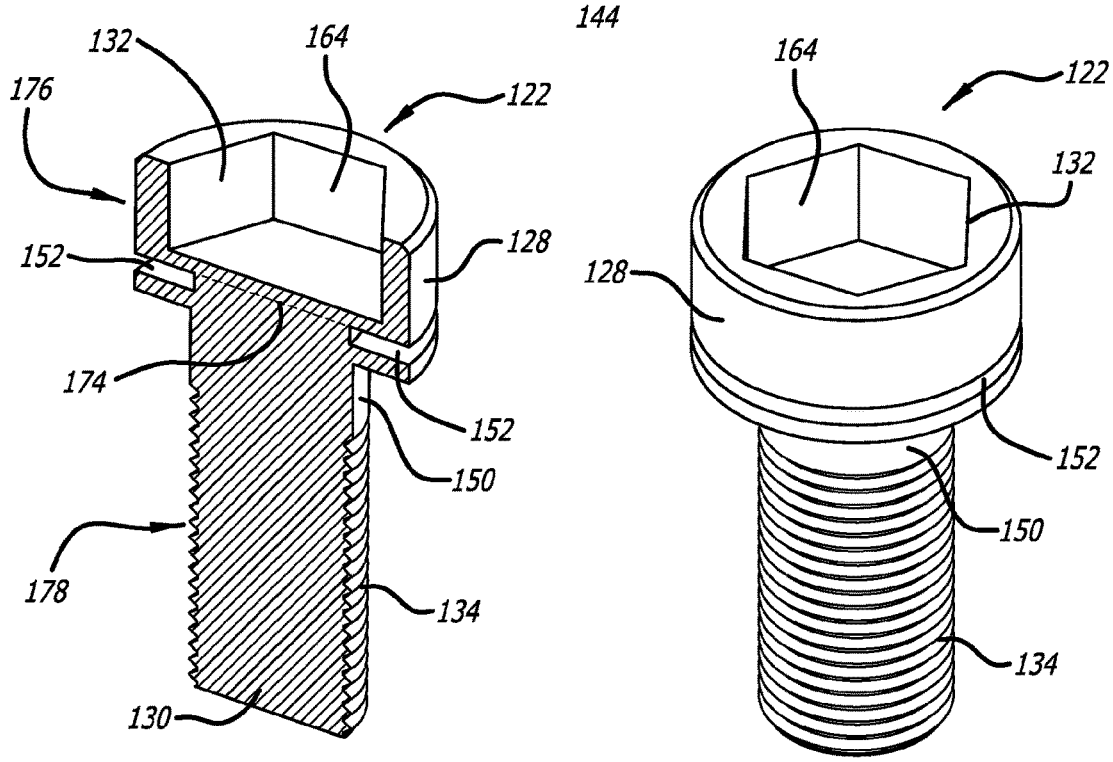
FIG. 10
FIG. 11  FIG. 12

LOCKING THREAD FASTENERS

This application is a 35 U.S.C. § 371 U.S. national stage patent application which claims the benefit of priority and is entitled to the filing date of International Patent Application PCT/EP2021/065518, filed Jun. 9, 2021, an international patent application which claims the benefit of priority and is entitled to the filing date pursuant to 35 U.S.C. § 119(e) of U.S. Provisional Patent Application No. 63/036,774, filed Jun. 9, 2020, the content of each of which is hereby incorporated by reference in its entirety.

BACKGROUND

The subject of this patent application relates generally to threaded fasteners with locking structures and features for preventing loosening of the fastener once tightened and to prevent tampering.

By way of background, standard threaded fasteners, such as screws, bolts, nuts, and the like, loosen over time due to vibration. Thread locking compound is applied to standard fasteners, but is messy and must be reapplied each time the fastener removed. Nuts and bolts with a nylon patch must be oriented correctly and can lose locking effectiveness if the fastener requires removing. Basically, many existing locking systems incur permanent damage in one or both the tightening and loosening process. Further, existing locking fasteners do not provide adequate anti-tampering features to prevent unauthorized removal. As such, what is needed is a fastener system that can be tightened and loosened numerous times without creating substantial permanent damage to the fastener's locking features the causing the locking effectiveness to degrade.

Aspects of the present invention fulfill these needs and provide further related advantages as described in the following summary.

SUMMARY

Aspects of the present invention teach certain benefits in construction and use which give rise to the exemplary advantages described below.

The present specification discloses a locking threaded fastener comprising a first fastener, a second fastener, and a rotating joint coupling the first fastener axially within the second fastener. The first fastener includes a first cylindrical body portion extending along a first cylindrical axis and a first thread formed on an outer surface of the first cylindrical body portion. The second fastener includes a second cylindrical body portion extending along a second cylindrical axis, with a through hole formed through the second cylindrical body portion along the second cylindrical axis, and a second thread formed on the second cylindrical body portion about the second cylindrical axis. The rotating joint captures at least a part of the first cylindrical body portion of the first fastener within the through hole of the second fastener component, such that the first threads are situated within the through hole and the first cylindrical axis is substantially coaxial with the second cylindrical axis to form an axis of rotation. The rotating joint limits substantial axial movement between the first fastener component and the second fastener component along the axis of rotation, and permits axial rotation between the first fastener component and the second fastener component about the axis of rotation. Further, the first thread is configured with a first thread handedness and the second thread is configured with a second thread handedness opposite the first thread handedness.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings, which are incorporated in and constitute a part of this specification, illustrate aspects of the disclosed subject matter in at least one of its exemplary embodiments, which are further defined in detail in the following description. Features, elements, and aspects of the disclosure are referenced by numerals with like numerals in different drawings representing the same, equivalent, or similar features, elements, or aspects, in accordance with one or more embodiments. The drawings are not necessarily to scale, emphasis instead being placed upon illustrating the principles herein described and provided by exemplary embodiments of the invention. In such drawings:

FIG. 10 is a cross-sectional top front perspective view of the second fastener;

FIG. 11 is a top front perspective view of the first fastener;

FIG. 12 is a cross-sectional top front perspective view of the first fastener of FIG. 11;

Figure 1:
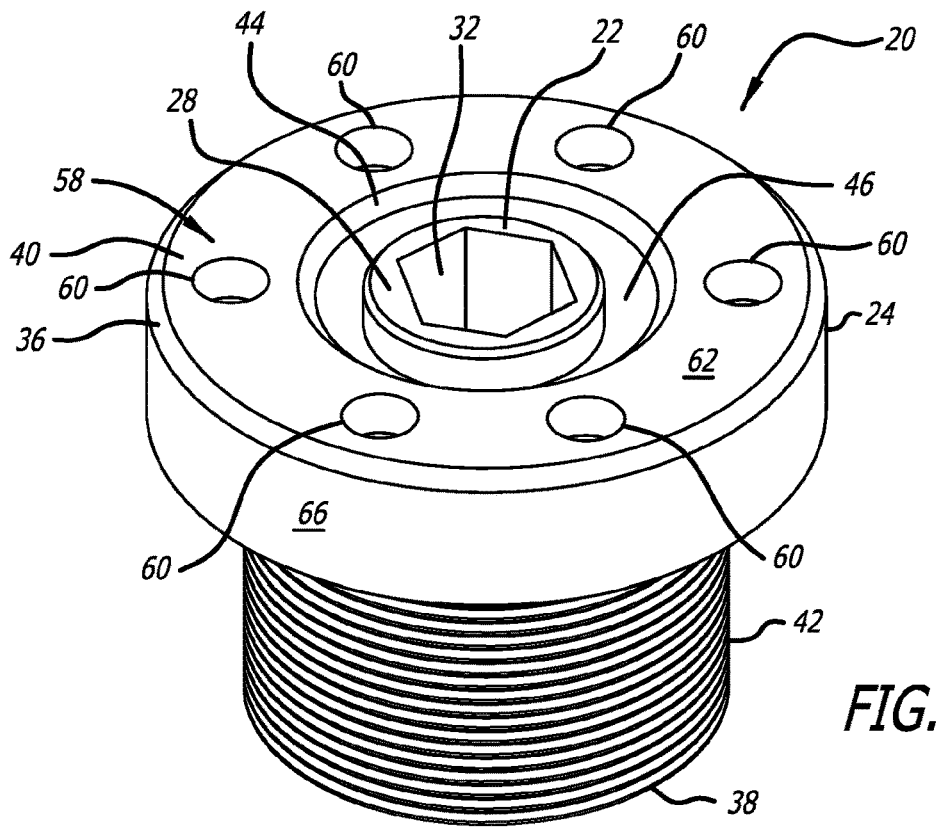
FIG. 1 is an assembled top front perspective view of an exemplary embodiment of a locking threaded fastener disclosed herein.

| Listing of Reference Numbers Associated with Drawings | |
|---|---|
| Ref. No. | Element |
| 20 | Locking threaded fastener |
| 22 | First fastener of locking threaded fastener 20 |
| 24 | Second fastener of locking threaded fastener 20 |
| 26 | Rotating joint of locking threaded fastener 20 |
| 28 | First head portion of first fastener 22 |
| 30 | First cylindrical body portion of first fastener 22 |
| 32 | First screw drive of first head portion 28 |
| 34 | First thread of first cylindrical body 30 |
| 36 | Second head portion of second fastener 24 |
| 38 | Second cylindrical body portion of second fastener 24 |
| 40 | Second screw drive of second head portion 36 |

| Ref. No. | Element |
|---|---|
| 42 | Second thread of second cylindrical body portion 38 |
| 44 | Through hole of locking threaded fastener 20 |
| 46 | Annular flange of first fastener 22 |
| 48 | Edge portion of annular flange 46 |
| 50 | Outer surface of first fastener 22 |
| 52 | Annular groove of second fastener 24 |
| 54 | Inner wall surface of second fastener 24 |
| 56 | Outer wall surface of second fastener 24 |
| 58 | Spanner screw drive of second head portion 36 |
| 60 | Spanner head pin holes of second head portion 36 |
| 62 | Annular top surface of second head portion 36 |
| 64 | Hex socket screw drive of first head portion 28 |
| 66 | Outer surface of second head portion 36 |
| 68 | First rotational direction of locking threaded fastener 20 |
| 70 | Second rotational direction of locking threaded fastener 20 |
| 72 | Common axis of rotation of locking threaded fastener 20 |
| 120 | Locking threaded fastener |
| 122 | First fastener of locking threaded fastener 120 |
| 124 | Second fastener of locking threaded fastener 120 |
| 126 | Rotating joint of locking threaded fastener 120 |
| 128 | First head portion of first fastener 122 |
| 130 | First cylindrical body portion of first fastener 122 |
| 132 | First screw drive of first head portion 128 |
| 134 | First thread of first cylindrical body 130 |
| 136 | Second head portion of second fastener 124 |
| 138 | Second cylindrical body portion of second fastener 124 |
| 140 | Second screw drive of second head portion 136 |
| 142 | Second thread of second cylindrical body portion 138 |
| 144 | Through hole of locking threaded fastener 120 |
| 146 | Annular flange of first fastener 122 |
| 148 | Edge portion of annular flange 146 |
| 150 | Outer surface of first fastener 122 |
| 152 | Annular groove of second fastener 124 |
| 154 | Inner wall surface of second fastener 124 |
| 156 | Outer wall surface of second fastener 124 |
| 158 | Spanner screw drive of second head portion 136 |
| 160 | Spanner head pin holes of second head portion 136 |
| 162 | Annular top surface of second head portion 136 |
| 164 | Hex socket screw drive of first head portion 128 |
| 166 | Outer surface of second head portion 136 |
| 168 | First rotational direction of locking threaded fastener 120 |
| 170 | Second rotational direction of locking threaded fastener 120 |
| 172 | Common axis of rotation of locking threaded fastener 120 |
| 174 | Bonding seam of first fastener 122 |
| 176 | Socket head portion of first fastener 122 |
| 178 | Threaded portion of first fastener 122 |
| 200 | Female mating fastener |
| 202 | Body portion of female mating fastener 200 |
| 204 | Head portion of female mating fastener 200 |
| 206 | Central threaded hole of body portion 202 |
| 208 | Threaded ring of body portion 202 |
| 210 | Stud of body portion 202 |
| 212 | Bottom of threaded ring 208 |
| 214 | First female thread of central threaded hole 206 |
| 216 | Second female thread of threaded ring 208 |
| 300 | Screwdriver tool |
| 302 | Input shaft of screwdriver tool 300 |
| 304 | Gear train of screwdriver tool 300 |
| 306 | Sun gear of screwdriver tool 300 |
| 308 | Planet gear of screwdriver tool 300 |
| 310 | Ring gear of screwdriver tool 300 |
| 312 | Outer race of screwdriver tool 300 |
| 314 | Ball bearing of screwdriver tool 300 |
| 316 | Carrier of screwdriver tool 300 |
| 318 | First driver portion of screwdriver tool 300 |
| 320 | Second driver portion of screwdriver tool 300 |
| 322 | First rotational direction of input shaft 302 |
| 324 | Second rotational direction ring gear 310 |

DETAILED DESCRIPTION

The present system in one or more embodiments provides a locking fastener that includes a first threaded fastener axially positioned within an axial through hole of a second threaded fastener, and captured therein by a rotating joint that permits rotation of the first threaded fastener and the second threaded fastener relative to one another about a common thread axis. In one or more embodiments, the first threaded fastener thread handedness is opposite to the second threaded fastener thread handedness. Additionally disclosed, is a screwdriver tool configured to simultaneously engage and oppositely rotate the first threaded fastener and the second threaded fastener into a mating component having a first mating thread and a second mating thread configured to receive the first threaded fastener and the second threaded fastener, respectively, driven at the same axial advance distance for each turn. Once tightened, the present locking fastener resists loosening and provides a tamper-resistant hold due to the requirement that the first threaded fastener and the second threaded fastener be simultaneously rotated at the same rate, but in opposite rotational directions, in order to be extracted from the mating threads.

Figure 2:
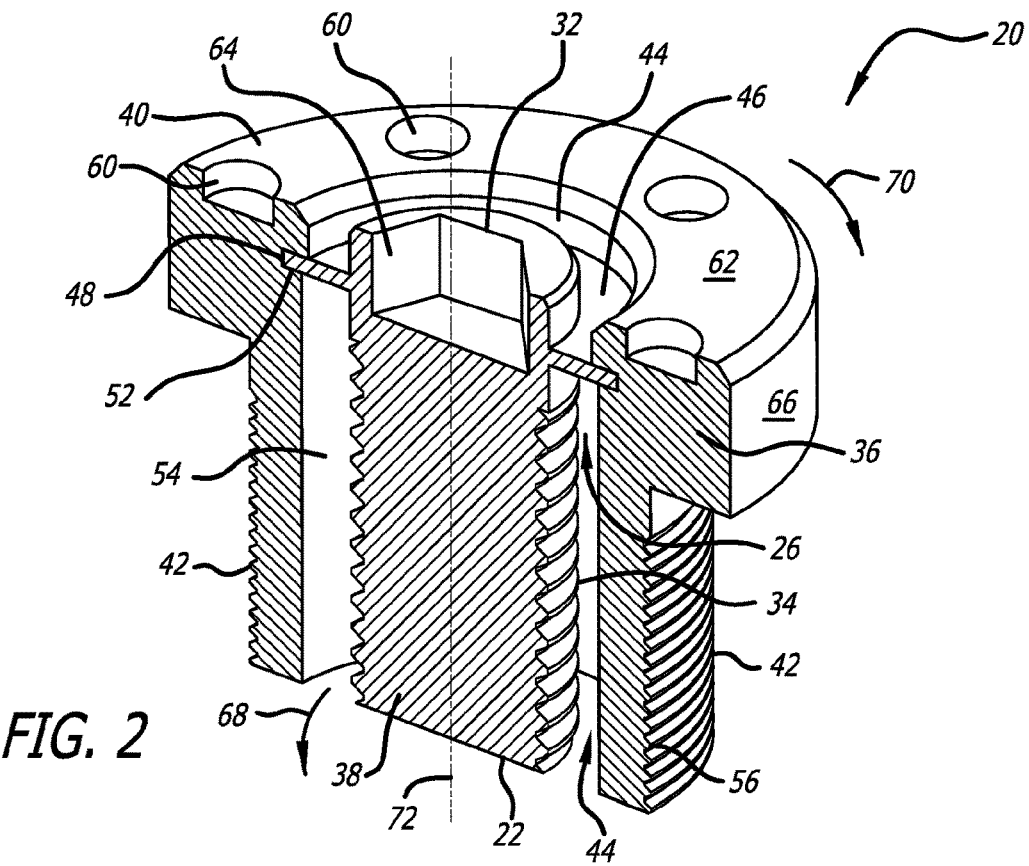
FIG. 2 is an assembled cross-sectional top front perspective view of the locking threaded fastener of FIG. 1.
Figure 3:
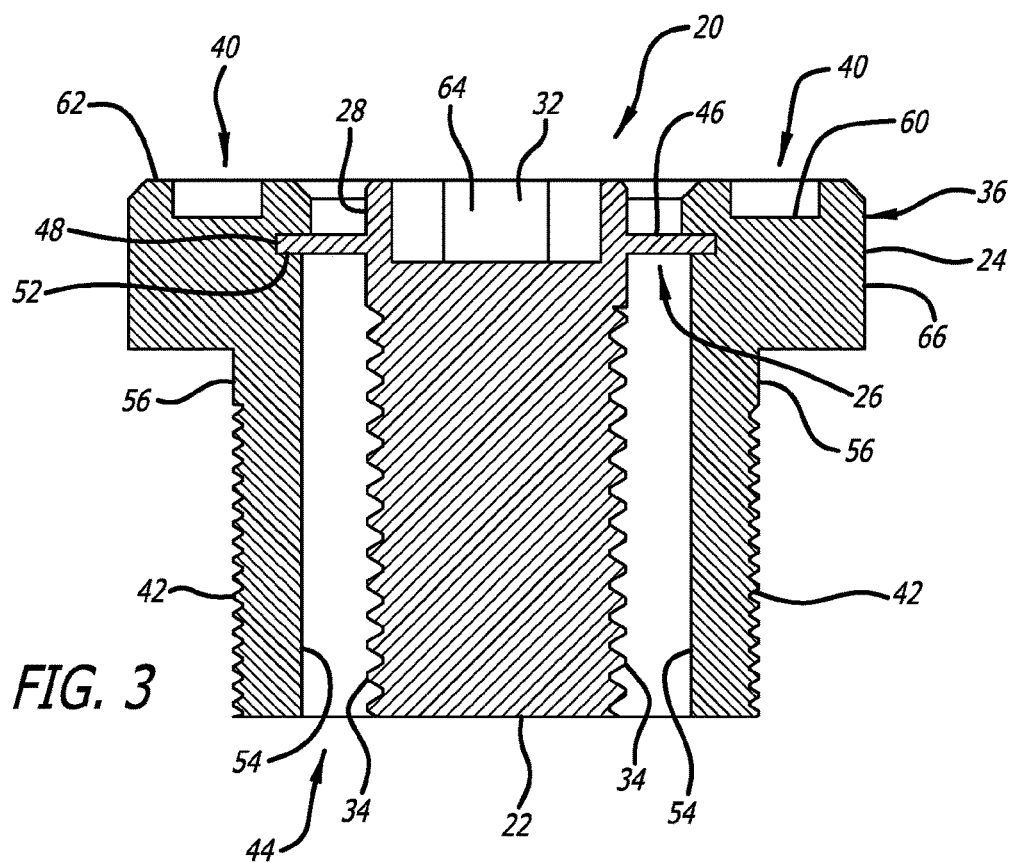
FIG. 3 is an assembled cross-sectional side view of the locking threaded fastener of FIG. 2.

An exemplary embodiment of the present locking thread fastener 20 (which may also be referred to herein as a fastener) is illustrated in an assembled configuration in FIGS. 1-3. In one or more embodiments, the locking thread fastener 20 comprises a first fastener 22, a second fastener 24, and a rotating joint 26.

Figure 5:
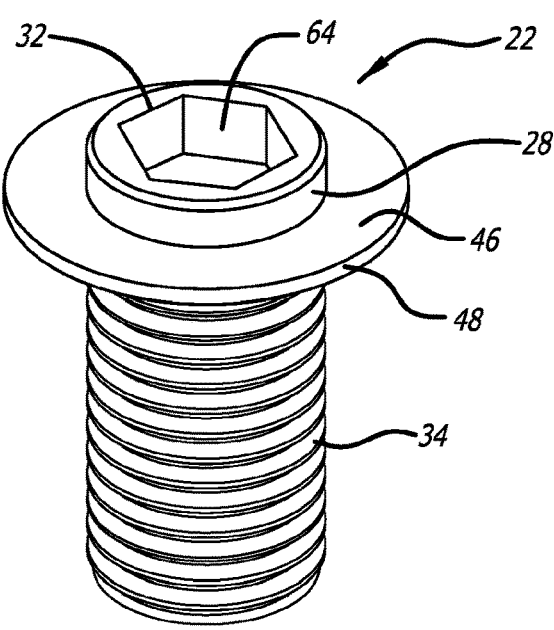
FIG. 5 is a top front perspective view of the first fastener.
Figure 6:
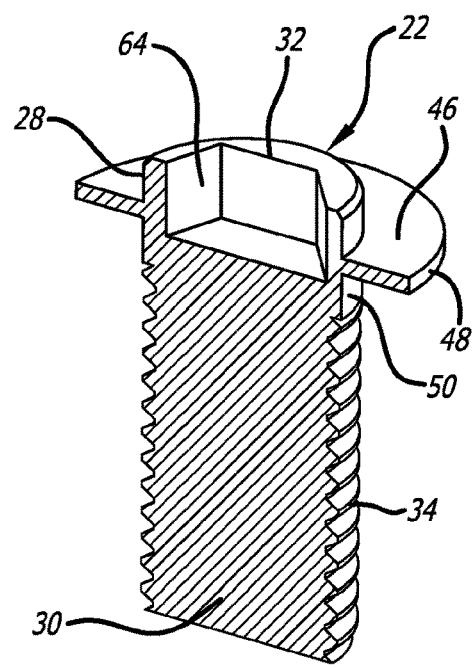
FIG. 6 is a cross-sectional top front perspective view of the first fastener of FIG. 5.
Figure 7:
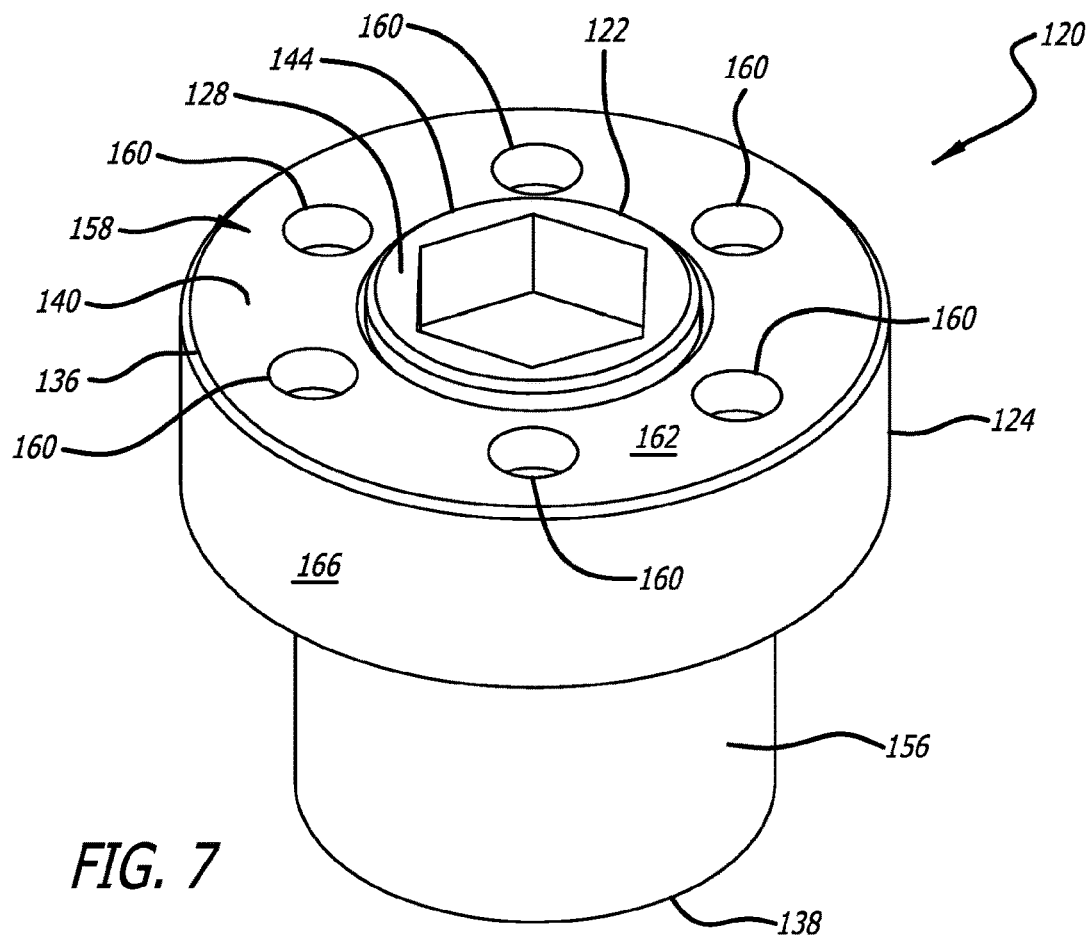
FIG. 7 is an assembled top front perspective view of another exemplary embodiment of a locking threaded fastener disclosed herein.

Referring also to FIGS. 5-6, the first fastener 22 comprises a first head portion 28 with a first cylindrical body portion 30 extending in an axial direction therefrom, defining a first cylindrical axis along the cylindrical axis that is colinear with the common axis of rotation 72 (as shown in FIG. 2). The first head portion 28 includes a first screw drive feature 32, which in this example embodiment, is a hex socket screw drive 64. A first thread 34 is formed on the outer surface 50 of the first cylindrical body portion 30 defining a thread axis that is colinear with the common axis of rotation 72. The first thread 34 includes a first thread handedness, either a right-hand thread or a left-hand thread. The illustrated embodiment further includes an annular flange 46 extending laterally (e.g., radially) from the outer surface 50 of the first cylindrical body portion 30; or in the illustrated example, the annular flange 46 extends from the first head portion 28. The exact position of the annular flange along the length of the first fastener 22 can change according to the requirements of the application. However, in many embodiments, the annular flange 46 with be positioned above the first thread 34, with all or at least a portion of the first head portion 28 protruding above the annular flange 46. In one or more embodiments the annular flange 46 is flush with the top of the first head portion 28. The purpose of the annular flange 46 will be discussed in greater detail below in reference to the rotating joint 26.

Figure 4:
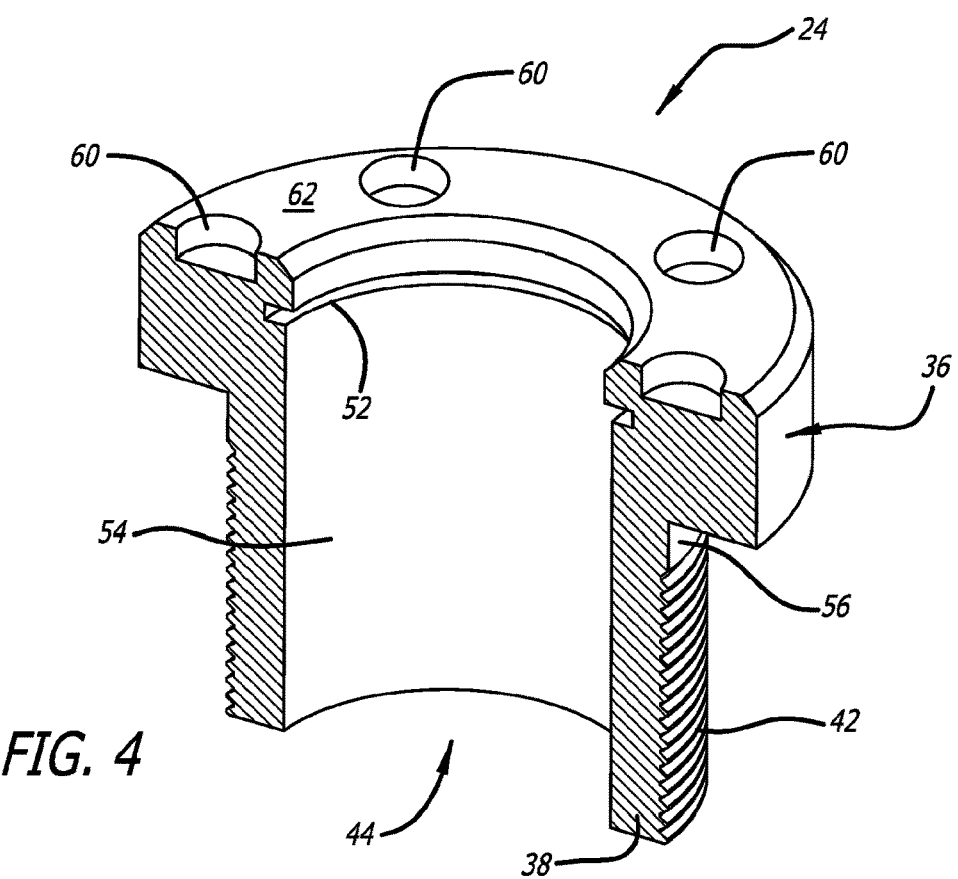
FIG. 4 is a cross-sectional top front perspective view of the second fastener.

Referring now to FIG. 4, the second fastener 24 comprises a second head portion 36 with a second cylindrical body portion 38 extending in an axial direction therefrom, defining a second cylindrical axis along the cylindrical axis that is colinear with the common axis of rotation 72 (as shown in FIG. 2). The second head portion 36 includes a second screw drive feature 32, which in this example embodiment, is a spanner screw drive 58 comprising a plurality of spanner head pin holes 60 formed into the annular top surface 62 of the second head portion 36 arranged in a circle about the annular top surface 62, and configured to receive the mating prongs of a screwdriver tool. A second thread 42 is formed on the outer wall surface 56 of the second cylindrical body portion 38, defining a thread axis that is colinear with the common axis of rotation 72. An axial through hole 44 is formed through the second fastener 24, with the axis of the axial through hole 44 along the cylindrical axis that is colinear with the common axis of rotation 72. The axial through hole 44 defines an inner wall surface 54 of the second fastener 24, where the axial through hole 44 is larger in diameter than the second cylindrical body portion 38, such that there is an annular gap between the first thread 34 of the first cylindrical body portion 38 and the inner wall surface 54 to permit clearance for the threading of the first thread 34 into a mating component.

Although the above explained and illustrated embodiment of the present fastener 20 describe the second fastener 24 having the second thread 42 is formed on the outer wall surface 54 of the second cylindrical body portion 38, in alternative embodiments, the second thread 42 can be formed on the inner wall surface 54 of the second cylindrical body portion 38.

The first thread 34 of the first fastener 22 includes a first thread handedness, either a right-hand thread or a left-hand thread, that is opposite, in one or more embodiments, the second thread handedness od second thread 42 of the second fastener 24. For example, if the first thread handedness is right-handed (e.g., a clockwise rotation will cause an axial advance into the mating thread), the second thread handedness will be left-handed (e.g., an anticlockwise rotation will cause an axial advance into the mating thread). In another example embodiment, if the first thread handedness is left-handed, then the second thread handedness will be right-handed. In this example embodiment, the first thread 34 is left-handed, such that a torque that produces movement in the first rotational direction 68 (anticlockwise when viewed from the top) will result in the first fastener 22 axially advancing into its respective mating thread (which will be described in greater detail in reference to FIG. 13). Additionally, in this example embodiment, the second thread 42 of the second fastener 24 is right-handed, such that a torque that produces movement in the second rotational direction 70 (clockwise when viewed from the top) will result in the second fastener 24 axially advancing into its respective mating thread. Although, in the illustrated embodiment of the present fastener 20 the first fastener 22 and the second fastener 24 are oppositely threaded, they can be like threaded where both have the same thread handedness.

In one or more example embodiments, and as shown in FIGS. 2-3, the rotating joint 26 comprises the annular flange 46 extending from the first fastener 22 and an annular groove 52 formed into the inner wall surface 54 of the second fastener 24. The perimetral edge portion 48 of the annular flange 46 is positioned within the annular groove 52 within the through hole 44 of the second fastener 24. In one or more embodiments, the width of the annular groove 52 is just sufficient to prohibit substantial axial movement or axial play of the first fastener 22, yet sufficiently wide to permit a slip fit, where the edge portion 48 of the annular flange 46 is permitted to rotate and slide through the annular groove 52 without an unacceptable level of binding that would prohibit threading of the present fastener 20. In one or more embodiments, the width of the annular groove 52 is substantially wider than the thickness of the annular flange 46, to limit the axial movement or axial play of the first fastener 22 to a predefined distance, such less than one fourth of a first thread pitch of the first thread 34, or less than one half of the first thread pitch of the first thread 34, or less than three fourths of the first thread pitch of the first thread 34, or less than one of the first thread pitch of the first thread 34. Although axial play may not be necessary or desired in many circumstances, there may be times where it may be advantageous to permit slight axial play so that the first thread 34 of the first fastener 22 can be aligned with the second thread 42 of the second fastener 24 to permit smooth and simultaneous threading of both without binding and to loosen tolerances for mass production.

Although the above explained and illustrated embodiment of the present fastener 20 describe a flange rigidly extending from the first fastener 22, other arrangements are possible to provide the rotating joint 26. For example, an annular groove can be formed on the outer surface 50 of the first fastener 22 and the inner wall surface 54 of the second fastener 24. A retaining ring can be sized to span between the two aligned annular grooves to create the rotating joint 26. If at least one of the annular grooves is made sufficiently deep, the retaining ring (installed within one of the annular grooves) can be deformed inwards or outwards within the deep annular groove, snapping back when aligned with the other annular groove.

When assembled, the first fastener 22 is configured to be captured within the through hole 44 of the second fastener 24 by the rotating joint 26, which substantially limits movement between the first fastener 22 and the second fastener 24 along the common axis of rotation 72. Further, the rotating joint 26 permits rotation of the first fastener 22 and the second fastener 24 relative to one another about the common axis of rotation 72. Thus, the first fastener 22 and the second fastener 24 are permitted to rotate relative to one another in the same direction or in opposite directions when not being threaded.

In one or more embodiments, the first thread 34 of the first fastener 22 and the second thread 42 of the second fastener 24 have like thread pitches, such that the first rotational speed of the first fastener 22 is equal in magnitude (although opposite in direction) to the second rotational speed of the second fastener 24, since the lead or axial distance traveled per revolution is the same for both the first fastener 22 and the second fastener 24. Thus, the first fastener 22 and the second fastener 24 can be driven at the same rotational rate.

In one or more embodiments, the first thread 34 of the first fastener 22 and the second thread 42 of the second fastener 24 have dissimilar thread pitches, such that the first rotational speed of the first fastener 22 is unequal in magnitude to the second rotational speed of the second fastener 24, due to the lead or axial distance traveled per revolution different for the first fastener 22 compared to the second fastener 24. If the first fastener 22 and the second fastener 24 were to be simultaneously rotated at the same rotational speed and in opposite directions, the first thread 34 and the second thread 42 would quickly bind within their respective mating threads.

When the first thread 34 of the first fastener 22 and the second thread 42 of the second fastener 24 have dissimilar thread pitches (where lead and pitch are the same for a single start thread) the relationship of the angular speed at which the first fastener 22 and the second fastener 24 must be rotated can be expressed in one or more embodiments as $L_{inner} * ((\alpha_{inner}/T_0)/360°) = L_{outer} * ((\beta_{outer}/T_0)/360°)$, where $L_{inner}$ and $L_{outer}$ indicate the lead of the first thread 34 and the second thread 42 respectively, $\alpha_{inner}$ and $\beta_{outer}$ indicate the angle in degrees the first fastener 22 and the second fastener 24 are rotated by respectively ($\beta$ denotes an inverse angle compared to $\alpha$), and $T_0$ indicates total time during which both rotations are exerted. Thus, in order to smoothly and simultaneously thread both the first fastener 22 and the second fastener 24 into a mating component, the lead of both the first thread 34 and the second thread 42 must be considered in the design of the screwdriver tool.

Figure 8:
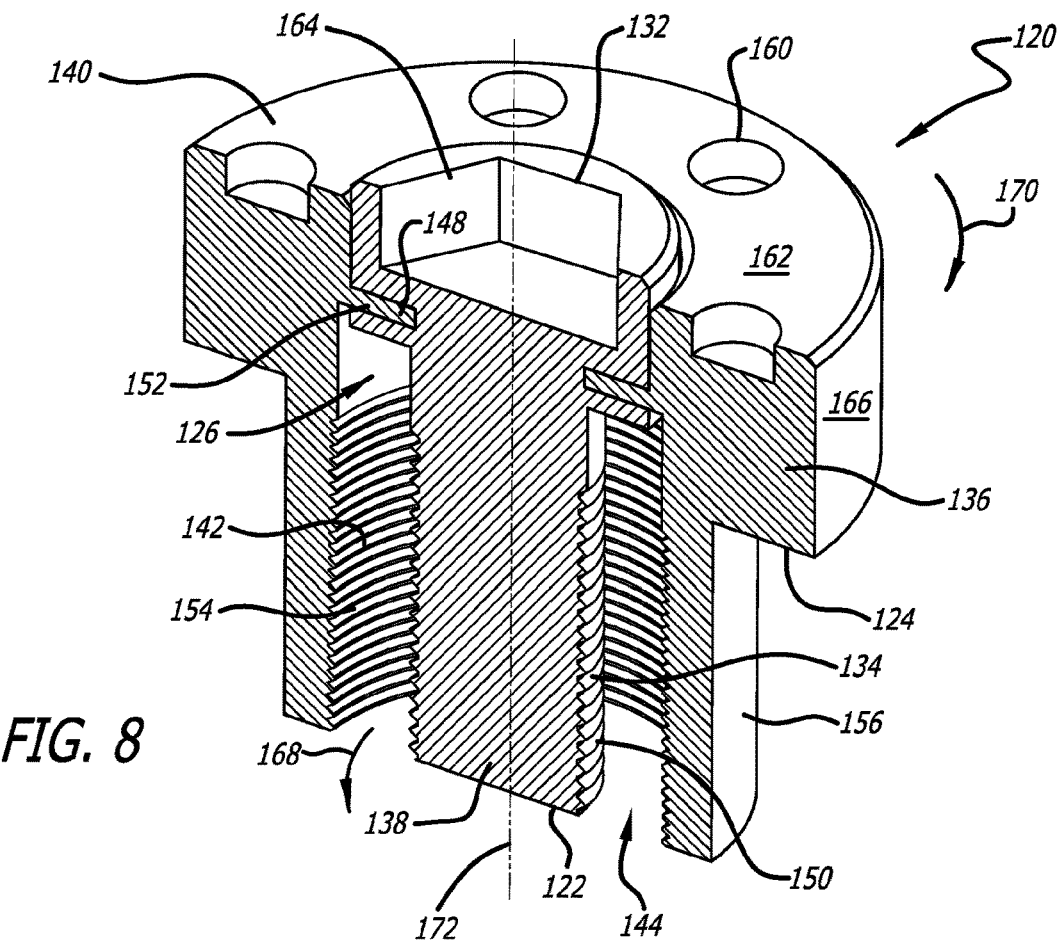
FIG. 8 is an assembled cross-sectional top front perspective view of the locking threaded fastener of FIG. 7.

Now, turning to FIGS. 7-12, a second example embodiment of the locking fastener 122 is illustrated. As shown in FIGS. 11-12, the first fastener 122 comprises a first head portion 128 with a first cylindrical body portion 130 extending in an axial direction therefrom, defining a first cylindrical axis along the cylindrical axis that is colinear with the common axis of rotation 172 (as shown in FIG. 8). The first head portion 128 includes a first screw drive feature 132, which in this example embodiment, is a hex socket screw drive 164. A first thread 134 is formed on the outer surface 150 of the first cylindrical body portion 130 defining a thread axis that is colinear with the common axis of rotation 172. The first thread 134 includes a first thread handedness. Instead of an annular flange, the illustrated embodiment includes an annular groove 152 formed into the first head portion 128 or the first cylindrical body portion 130.

Referring to FIG. 10, the second fastener 124 comprises a second head portion 136 with a second cylindrical body portion 138 extending in an axial direction therefrom, defining a second cylindrical axis along the cylindrical axis that is colinear with the common axis of rotation 172 (as shown in FIG. 8). The second head portion 136 includes a second screw drive feature 132, which in this example embodiment, is a spanner screw drive 158 comprising a plurality of spanner head pin holes 160 formed into the annular top surface 162 of the second head portion 136 arranged in a circle about the annular top surface 162, and configured to receive the mating prongs or pins of the screwdriver tool. A second thread 142 is formed on the inner wall surface 154 of the second cylindrical body portion 138, defining a thread axis that is colinear with the common axis of rotation 172. An axial through hole 144 is formed through the second fastener 124, with the axis of the axial through hole 144 along the cylindrical axis that is colinear with the common axis of rotation 172. The axial through hole 144 defines the inner wall surface 154 of the second fastener 124, where the axial through hole 144 is larger in diameter than the second cylindrical body portion 138, such that there is an annular gap between the first thread 134 of the first cylindrical body portion 130 and the inner wall surface 154 to permit clearance for the threading of the first thread 134 into a mating component.

Although the above explained and illustrated embodiment of the present fastener 120 describe the second fastener 124 having the second thread 142 is formed on the inner wall surface 154 of the second cylindrical body portion 138, in alternative embodiments, the second thread 142 can be formed on the outer wall surface 156 of the second cylindrical body portion 138.

The first thread 134 of the first fastener 122 includes a first thread handedness, either a right-hand thread or a left-hand thread, that is opposite, in one or more embodiments, the second thread handedness od second thread 142 of the second fastener 124. For example, if the first thread handedness is right-handed (e.g., a clockwise rotation will cause an axial advance into the mating thread), the second thread handedness will be left-handed (e.g., an anticlockwise rotation will cause an axial advance into the mating thread). In another example embodiment, if the first thread handedness is left-handed, then the second thread handedness will be right-handed. In this example embodiment, the first thread 134 is left-handed, such that a torque that produces movement in the first rotational direction 168 (anticlockwise when viewed from the top) will result in the first fastener 122 axially advancing into its respective mating thread (which will be described in greater detail in reference to FIG. 13). Additionally, in this example embodiment, the second thread 142 of the second fastener 124 is right-handed, such that a torque that produces movement in the second rotational direction 170 (clockwise when viewed from the top) will result in the second fastener 124 axially advancing into its respective mating thread. Although, in the illustrated embodiment of the present fastener 120 the first fastener 122 and the second fastener 124 are oppositely threaded, they can be like threaded where both have the same thread handedness.

Figure 9:
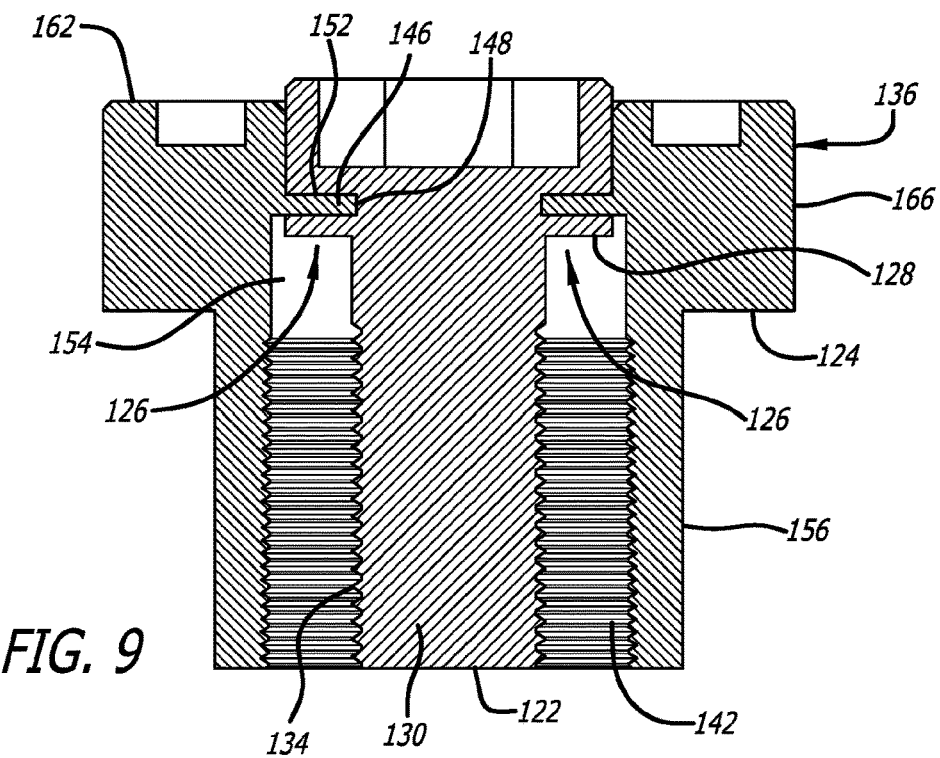
FIG. 9 is an assembled cross-sectional side view of the locking threaded fastener of FIG. 8.

Referring to FIGS. 8-9, the rotating joint 126 comprises the annular flange 146 extending from the inner wall surface 154 of the second fastener 124 and an annular groove 152 formed into the first fastener 122 (either the first head portion 128, as illustrated, or the first cylindrical body portion 130). The exemplary annular flange 146 forms a washer-like protrusion into the through hole 144 of the second fastener 124. The perimetral edge portion 148 of the annular flange 146 is positioned within the annular groove 152. In one or more embodiments, the width of the annular groove 152 is just sufficient to prohibit substantial axial movement or axial play of the first fastener 122, yet sufficiently wide to permit a slip fit, where the edge portion 148 of the annular flange 146 is permitted to rotate and slide through the annular groove 152 without an unacceptable level of binding that would prohibit threading of the present fastener 120.

Although the above explained and illustrated embodiment of the present fastener 120 describe a flange rigidly extending from the second fastener 124, other arrangements are possible to provide the rotating joint 126. For example, an annular groove can be formed on the outer surface 150 of the first fastener 122 and the inner wall surface 154 of the second fastener 124. A retaining ring can be sized to span between the two aligned annular grooves to create the rotating joint 126. If at least one of the annular grooves is made sufficiently deep, the retaining ring (installed within one of the annular grooves) can be deformed inwards or outwards within the deep annular groove, snapping back when aligned with the other annular groove.

Looking at FIG. 11, a bonding seam 174 can be seen as a dashed line at the top of the annular groove 152 formed into the first head portion 128 of the first fastener 122. To aid in assembly, the first fastener 122 or second fastener 124 can be split into two parts. Here, the socket head portion 176 of the first head portion 128 is bonded to the top end of the threaded portion 178 of the first cylindrical body portion 130, with the socket head portion 176 defining the top of the annular groove 152. To assemble the fastener 120 the threaded portion 178 can be inserted through the through hole 144 from the underside of the annular flange 146; and the socket head portion 176 can be mated to the threaded portion 178 from the top side of the annular flange 146. The two parts can be threaded together, bonded, welded (i.e., spot welded, friction welded, brazed, etc.), or joined by some other process to capture the annular flange 146 within the annular groove 152 and provide a bond sufficient to withstand the expected torque of insertion and/or extraction of the fastener 20.

Instead of creating a two-part first fastener 122 as described above, the first fastener 122 can be designed with a malleable first head portion 128 that can be bent over, crushed in a riveting process, or other process that can create the annular groove 152 or other structure that provides a similar function thereto. Yet another exemplary manufacturing method could entail molding or printing the fastener 122, with the annular flange 146 injection molded or printed within the annular groove 152, which can thereafter be freed (if any thin webbing or the like connects the annular flange 146 to the annular groove 152) by twisting the first fastener 122 and the second fastener 124 relative to one another.

Although particular screw drive systems are illustrated herein for the first fastener 22, 122 and the second fastener 24, 124, a wide variety of screw drives are compatible with the present locking thread fastener 20, 120 such as slotted, cruciform (i.e., the Phillips screw drive, etc.), external polygon (i.e., the hex screw drive, etc.), the hexalobular socket screw drive (i.e., the TORX screw drive), and other screw drives. For example, outer surface 66, 166 of second head portion 26, 136 can be shaped as an external hex for receiving a hex socket.

Figure 13:
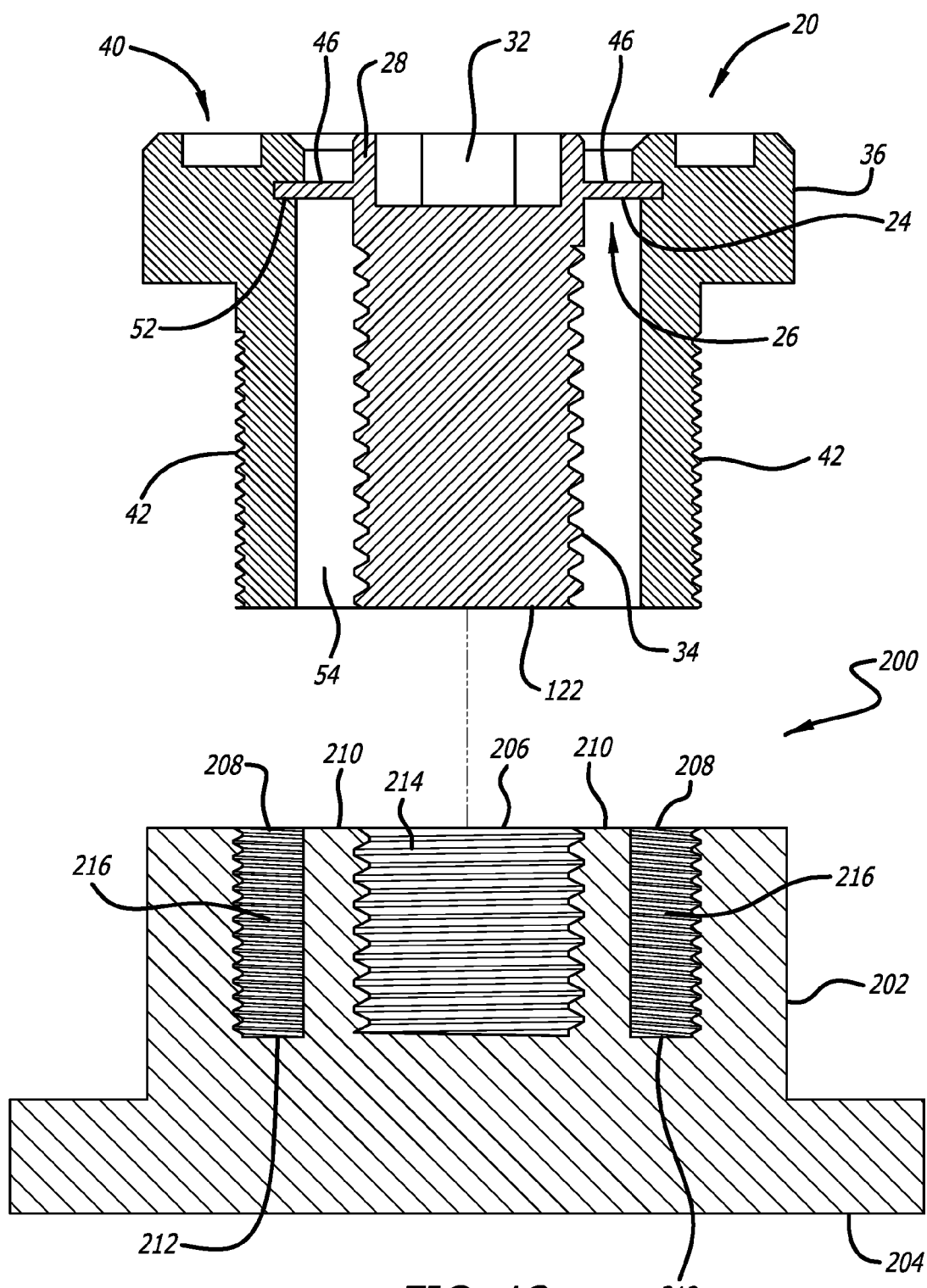
FIG. 13 is an assembled cross-sectional side view of the locking threaded fastener shown aligned with and ready to be threaded to a mating component.

Looking now at FIG. 13, a mating fastener 200 (which may also be referred to as a nut in this example embodiment, as it acts somewhat like a binding barrel nut) can be seen aligned and ready for coupling to the present locking fastener 20. The mating fastener 200 includes a body portion 202 extending from an optional head portion 204. A stud 210 defines a central threaded hole 206 and a threaded ring 208 is defined by stud 210 and body portion 202 in a manner where the threaded ring 208 surrounds and is concentric with the central threaded hole 206. The central threaded hole 206 has formed therein a first female thread 214 formed on an inner surface of stud 210, and configured to receive therein the first fastener 22, with the first threads 34 threadably engaged with the first female thread 214. The threaded ring 208 has formed a second female threads 216 on surface of body portion 202 defining threaded ring 208, and configured to receive therein the second fastener 24, with the second thread 42 threadably engaged with the second female thread 216. The handedness of the first female thread 214 is matched to the handedness of the first thread 34 of the first fastener 22. The handedness of the second female thread 216 is matched to the handedness of the second thread 42 of the second fastener 24. Thus, the handedness of the first female thread 214 and the second female thread 216 are opposite one another in this example embodiment. As described above, the first fastener 22 and the second fastener 24 must be simultaneously turned in opposite directions in order to be threaded into their respective threaded receptacles (e.g., the central threaded hole 206 and the threaded ring 208, respectively).

Manufacturing the mating fastener 200 can be achieved, in one or more embodiments, by milling a large blind hole in the body portion 202 and tapping the hole to provide the second female thread and provide an outer nut. An inner nut can be created by milling and tapping a stud and concentrically attaching it to the bottom 212 of the large blind hole by a bonding process, a male thread on the stud, or other known means of attachment.

Although not shown, the mating fastener 200 can be configured for coupling to the present locking fastener 120. In this example embodiment, the threaded ring 208 has formed a second female threads 216 on outer surface of stud 210 defining threaded ring 208, and configured to receive therein the second fastener 124, with the second thread 142 threadably engaged with the second female thread 216.

Figure 14:
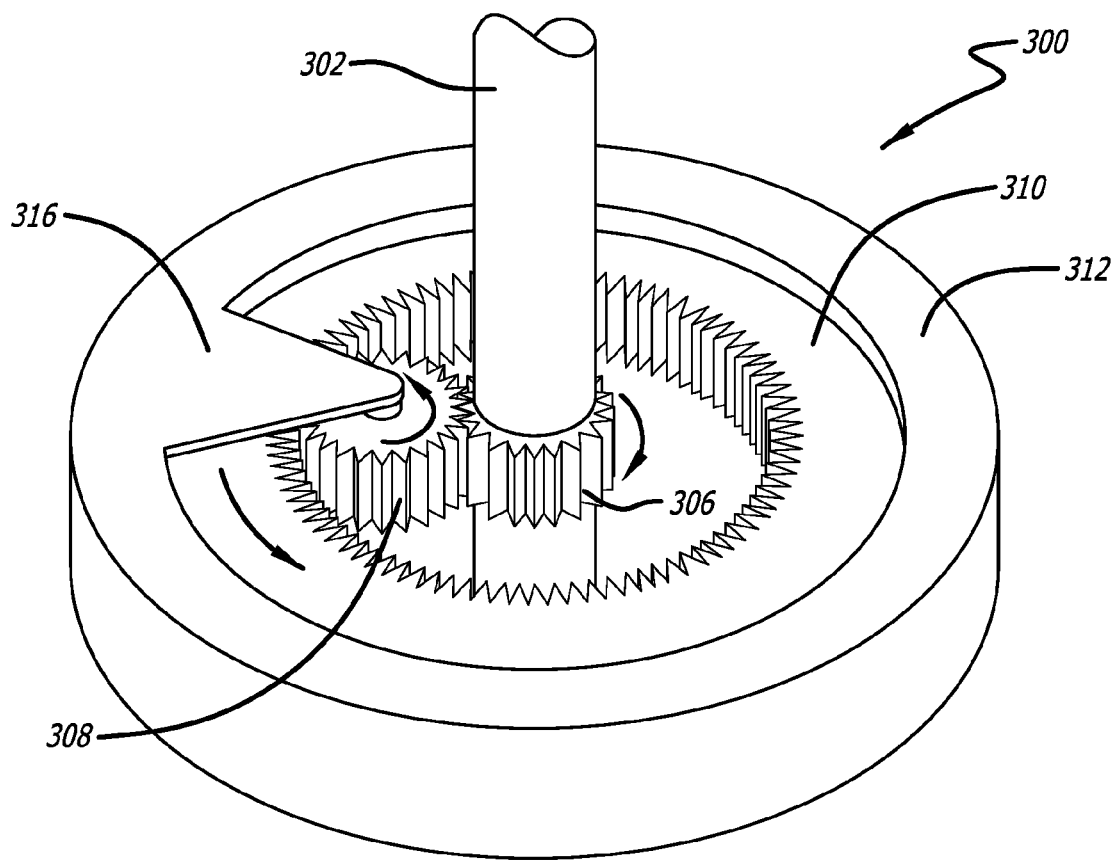
FIG. 14 is a top front perspective schematic view of an exemplary screwdriver tool, illustrating the internal gear train.
Figure 15:
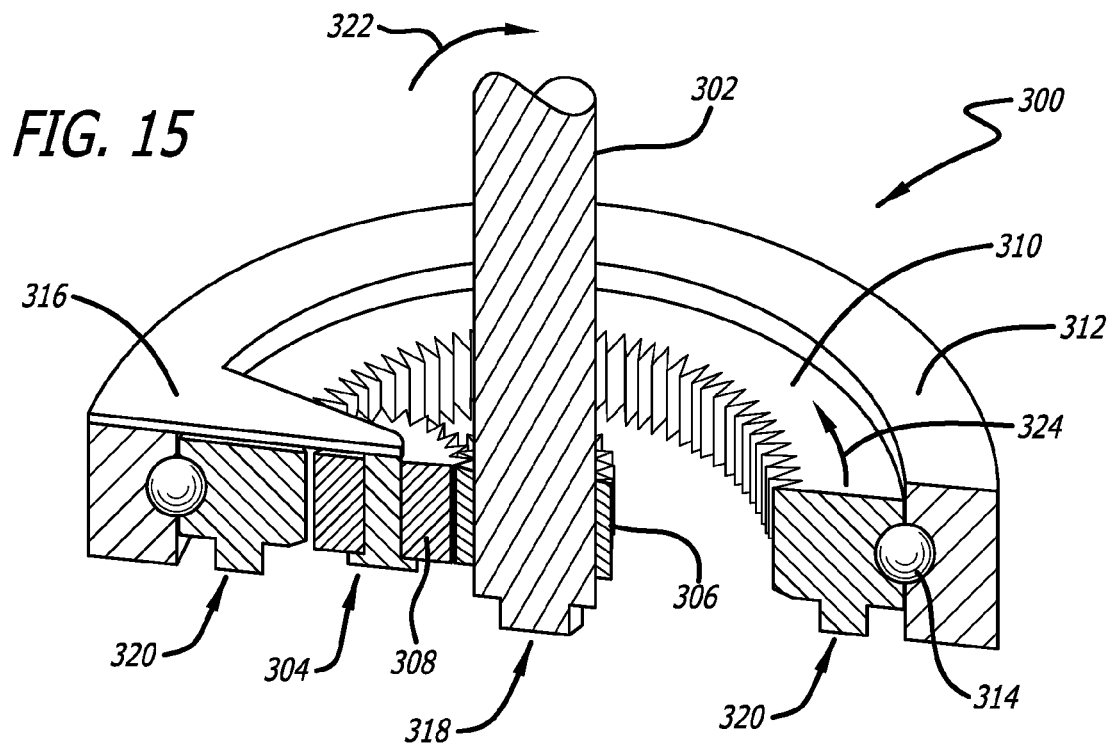
FIG. 15 is a cross-sectional top front perspective schematic view of the screwdriver tool of FIG. 14.

The present specification also discloses a screwdriver using to fasten or loosen a locking fastener disclosed herein, such as, e.g., locking fastener 20, 120. Looking now at FIGS. 14-15, the inner workings of a screwdriver tool 300 is shown schematically. The input shaft 302 includes a sun gear 306 axially mounted thereon. A first driver portion 318 is formed on or attached to the input shaft 302. An outer race 312 concentrically carries a ring gear 310 forming a bearing, with ball bearings 314 captured between the outer race 312 and the ring gear 310 (where the ring gear 310 acts much like an inner race), such that the ring gear 310 permitting to rotated relative to the outer race 312, which is directly or indirectly fixed by one hand operating the tool and preventing rotation of the outer race 312. A carrier 316 extends inwardly from and is mounted on the outer race 312. A planet gear 308 is rotatably mounted to the carrier 316 and is positioned between the sun gear 306 and the ring gear 310. The planet gear 308 transmits torque from the sun gear 306 to the ring gear 310. As the input shaft 302 rotates in a first rotational direction 322, the gear train 304 converts the first rotational direction 322 into an opposite second rotational direction 324. Depending on the gearing ratios within the gear train 304, the rotational speed of the input shaft 302 and the rotational speed of the ring gear 308 can be configured to be the same or different. The gear train 304 is designed to create a difference is the rotational speed of the input shaft 302 and the rotational speed of the ring gear 308 to match the difference in the first thread 34, 134 pitch and the second thread 42, 142 pitches, so that the first axial advance distance of the first thread 34, 134 is the same as the second axial advance distance of the second thread 42, 142 for each revolution. Although the screwdriver tool 300 is somewhat schematic is representation, it can be seen that the input shaft 302 directly drives the first fastener 22 through the first driver portion 318, and drives the second fastener 24 through the second driver portion 320 moving with the ring gear 312. In this way, the first fastener 22, 122 and the second fastener 24, 124 can be rotated in opposite directions at differing or the same speeds.

The present locking fastener, such as, e.g., locking fastener 20, 120, provides a means to lock the threads within a mating component and quickly remove the locking fastener without substantial permanent damage to the threads or the requirement for adhesive coating. A locking fastener disclosed herein, such as, e.g., locking fastener 20, 120, resists loosening due to vibration due to the requirement that the coaxial fastener components be simultaneously counterrotated to produce a similar axial advance distance for each turn. Thus, although vibration may tend to cause rotation of one of the two threaded fastener components in one rotational direction, loosening is not permitted due to a rotating joint disclosed herein, such as, e.g., rotating joint 26, 126, blocking axial advance of the would-be loosened threaded fastener component. Further, certain vibrations that may tend to cause loosening in one rotational direction may also cause tightening in the oppositely threaded fastener.

Aspects of the present specification may also be described by the following embodiments:

1. A fastener comprising a first fastener, a second fastener, and a rotating joint. The first fastener component includes a first head portion, a first cylindrical body portion extending from the first head portion along a first cylindrical axis, a first thread formed on the first cylindrical body portion about the first cylindrical axis, where the first thread has a first thread handedness. The second fastener component includes a second head portion, a second cylindrical body portion extending from the second head portion along a second cylindrical axis, a through hole formed through the second head portion and the second cylindrical body portion along the second cylindrical axis, a second thread formed on the second cylindrical body portion about the second cylindrical axis, where the second thread has a second thread handedness opposite the first thread handedness, and at least a part of the first cylindrical body portion of the first fastener is positioned within the through hole such that the first threads are situated within the through hole and the first cylindrical axis is substantially coaxial with the second cylindrical axis to form an axis of rotation. The rotating joint captures part of the first cylindrical body portion of the first fastener within the through hole of the second fastener component to limit substantial axial movement between the first fastener component and the second fastener component along the axis of rotation and permits axial rotation between the first fastener component and the second fastener component about the axis of rotation.
2. The fastener of embodiment 1, wherein the first head portion of the first fastener component includes a first screw drive and the second head portion of the second fastener component includes a second screw drive.
3. The fastener of embodiments 1 or 2, wherein the first head portion is configured to be engaged by the first screw drive to rotate the first fastener component in a first rotational direction about the axis of rotation, and the second head portion is configured to be engaged by the second screw drive to rotate the second fastener component in a second rotational direction about the axis of rotation, the second rotational direction being opposite the first rotational direction.
4. The fastener of any one of embodiments 1-3, wherein the first screw drive is configured to be engaged by a first driver portion of a screwdriver tool to rotate the first fastener component in the first rotational direction about the axis of rotation and the second screw drive is configured to be engaged by a second driver portion of the screwdriver tool to rotate the second fastener component in the first rotational direction about the axis of rotation.
5. The fastener of any one of embodiments 1-4, wherein the first fastener component is configured to be rotated at a first rotational speed in the first rotational direction by a first torque applied by the first driver portion of the screw driver tool, and the second fastener component is configured to be rotated at a second rotational speed in the second rotational direction by a second torque applied by the second driver portion of the screw driver tool, where the first driver portion of the screw driver tool is coupled to the second driver portion of the screw driver tool through a gear train such that a single torque input provides the first torque and the second torque.
6. The fastener of any one of embodiments 1-5, wherein a first magnitude of the first rotational speed is different than a second magnitude of the second rotational speed.
7. The fastener of any one of embodiments 1-6, wherein the rotating joint comprises an annular flange having an edge portion inserted within an annular groove, permitting relative rotation between the annular flange and the annular groove.
8. The fastener of any one of embodiments 1-7, wherein the annular flange is formed on an outer surface of the first fastener component and the annular groove is formed into a wall surface of the through hole of the second fastener component.
9. The fastener of any one of embodiments 1-8, wherein the annular groove is formed into an outer surface of the first fastener component and the annular flange is formed on a wall surface of the through hole of the second fastener component.
10. The fastener of any one of embodiments 1-9, wherein the first thread is formed on an outer surface of the first fastener component and the second thread is formed on a wall surface of the through hole of the second fastener component.
11. The fastener of any one of embodiments 1-10, wherein the first thread is formed on an outer surface of the first fastener component and the second thread is formed on an outer wall surface of the second cylindrical body portion of the second fastener component.
12. The fastener of any one of embodiments 1-11, wherein a first rotational speed of the first fastener component is configured to be different than a second rotational speed of the second fastener component when being simultaneously threaded to a mating component.
13. The fastener of any one of embodiments 1-12, wherein a first lead distance of the first thread of the first fastener component is different than a second lead distance of the second thread of the second fastener component, and wherein a first rotational speed of the first fastener component is configured to be different than a second rotational speed of the second fastener component when being simultaneously threaded to a mating component, such that a first axial advance distance of the first fastener component is substantially equal to a second axial advance distance of the second fastener component.
14. The fastener of any one of embodiments 1-13, wherein the first head portion of the first fastener component includes a first screw drive and the second head portion of the second fastener component includes a second screw drive; the first screw drive is configured to be engaged by a first driver portion of a screw driver tool to rotate the first fastener component in the first rotational direction about the axis of rotation and the second screw drive is configured to be engaged by a second driver portion of the screw driver tool to rotate the second fastener component in the second rotational direction about the axis of rotation, wherein the first driver portion of the screw driver tool is coupled to the second driver portion of the screw driver tool through a gear train such that a single torque input provides a first torque to the first screw drive and a second torque to the second screw drive.
15. The fastener of any one of embodiments 1-14, wherein a first lead distance of the first thread is the same as a second lead distance of the second thread.
16. The fastener of any one of embodiments 1-15, wherein an axial play distance between the first fastener component and the second fastener component is limited by the rotating joint to less than one fourth of a first thread pitch of the first thread, or less than one half of the first thread pitch of the first thread, or less than three fourths of the first thread pitch of the first thread, or less than one of the first thread pitch of the first thread.
17. A fastener comprising a first fastener, a second fastener, and a rotating joint. The first fastener includes a first cylindrical body portion extending along a first cylindrical axis and a first thread formed on an outer surface of the first cylindrical body portion. The second fastener component includes a second cylindrical body portion extending a second cylindrical axis, a through hole formed through the second cylindrical body portion along the second cylindrical axis, a second thread formed on the second cylindrical body portion about the second cylindrical axis. The rotating joint captures at least a part of the first cylindrical body portion of the first fastener within the through hole of the second fastener component such that the first threads are situated within the through hole and the first cylindrical axis is substantially coaxial with the second cylindrical axis to form an axis of rotation, where the rotating joint limits substantial axial movement between the first fastener component and the second fastener component along the axis of rotation, and the rotating joint permits axial rotation between the first fastener component and the second fastener component about the axis of rotation.

18. The fastener of embodiment 17, wherein the first thread is configured with a first thread handedness and the second thread is configured with a second thread handedness opposite the first thread handedness.

19. A method of driving a threaded fastener comprising: Providing a first threaded fastener positioned within an axial through hole of a second threaded fastener, the first threaded fastener being coupled to the second threaded fastener through a rotating joint configured to limit substantial axial movement between the first fastener component and the second fastener component along a common axis of rotation, the rotating joint configured to permit axial rotation between the first fastener component and the second fastener component about the common axis of rotation. Applying, simultaneously, a first torque to the first threaded fastener configured to rotate the first threaded fastener in a first rotational direction about a common thread axis and a second torque to the second threaded fastener configured to rotate the second threaded fastener in a second rotational direction about the common thread axis, wherein the common thread axis is substantially colinear the common axis of rotation.

20. The method of embodiment 19, further comprising providing a screw driver tool with a first driver portion and a second driver portion wherein the first driver portion of the screwdriver tool is coupled to the second driver portion of the screw driver tool through a gear train such that a single torque input provides the first torque and the second torque, wherein the gear train is configured to rotate the first driver portion in the first rotational direction and rotate the second driver portion in the second rotational direction opposite the first rotational direction.

In closing, foregoing descriptions of embodiments of the present invention have been presented for the purposes of illustration and description. It is to be understood that, although aspects of the present invention are highlighted by referring to specific embodiments, one skilled in the art will readily appreciate that these described embodiments are only illustrative of the principles comprising the present invention. As such, the specific embodiments are not intended to be exhaustive or to limit the invention to the precise forms disclosed. Therefore, it should be understood that embodiments of the disclosed subject matter are in no way limited to a particular element, compound, composition, component, article, apparatus, methodology, use, protocol, step, and/or limitation described herein, unless expressly stated as such.

In addition, groupings of alternative embodiments, elements, steps and/or limitations of the present invention are not to be construed as limitations. Each such grouping may be referred to and claimed individually or in any combination with other groupings disclosed herein. It is anticipated that one or more alternative embodiments, elements, steps and/or limitations of a grouping may be included in, or deleted from, the grouping for reasons of convenience and/or patentability. When any such inclusion or deletion occurs, the specification is deemed to contain the grouping as modified, thus fulfilling the written description of all Markush groups used in the appended claims.

Furthermore, those of ordinary skill in the art will recognize that certain changes, modifications, permutations, alterations, additions, subtractions, and sub-combinations thereof can be made in accordance with the teachings herein without departing from the spirit of the present invention.

Furthermore, it is intended that the following appended claims and claims hereafter introduced are interpreted to include all such changes, modifications, permutations, alterations, additions, subtractions, and sub-combinations as are within their true spirit and scope. Accordingly, the scope of the present invention is not to be limited to that precisely as shown and described by this specification.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

The words, language, and terminology used in this specification is for the purpose of describing particular embodiments, elements, steps and/or limitations only and is not intended to limit the scope of the present invention, which is defined solely by the claims. In addition, such words, language, and terminology are to be understood not only in the sense of their commonly defined meanings, but to include by special definition in this specification structure, material or acts beyond the scope of the commonly defined meanings. Thus, if an element, step, or limitation can be understood in the context of this specification as including more than one meaning, then its use in a claim must be understood as being generic to all possible meanings supported by the specification and by the word itself.

The definitions and meanings of the elements, steps or limitations recited in a claim set forth below are, therefore, defined in this specification to include not only the combination of elements, steps or limitations which are literally set forth, but all equivalent structure, material or acts for performing substantially the same function in substantially the same way to obtain substantially the same result. In this sense it is therefore contemplated that an equivalent substitution of two or more elements, steps or limitations may be made for any one of the elements, steps or limitations in a claim set forth below or that a single element, step, or limitation may be substituted for two or more elements, steps, or limitations in such a claim. Although elements, steps or limitations may be described above as acting in certain combinations and even initially claimed as such, it is to be expressly understood that one or more elements, steps or limitations from a claimed combination can in some cases be excised from the combination and that the claimed combination may be directed to a sub-combination or variation of a sub-combination. As such, notwithstanding the fact that the elements, steps and/or limitations of a claim are set forth below in a certain combination, it must be expressly understood that the invention includes other combinations of fewer, more, or different elements, steps and/or limitations, which are disclosed in above even when not initially claimed in such combinations. Furthermore, insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Accordingly, the claims are thus to be understood to include what is specifically illustrated and described above, what is conceptually equivalent, what can be obviously substituted and also what essentially incorporates the essential idea of the invention.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as, e.g., "first," "second," "third," etc. —for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as, e.g., "comprise" and "comprises", and equivalent open-ended transitional phrases thereof like "including," "containing" and "having", encompass all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as, e.g., "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim, whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such, the embodiments described herein or so claimed with the phrase "comprising" expressly and unambiguously provide description, enablement, and support for the phrases "consisting essentially of" and "consisting of."

Lastly, all patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard is or should be construed as an admission that the inventors are not entitled to antedate such disclosure by virtue of prior invention or for any other reason. All statements as to the date or representation as to the contents of these documents are based on the information available to the applicant and do not constitute any admission as to the correctness of the dates or contents of these documents.

The invention claimed is:

1. A fastener comprising:
a first fastener component having a first head portion, a first cylindrical body portion extending from the first head portion along a first cylindrical axis, a first thread formed on the first cylindrical body portion about the first cylindrical axis, the first thread having a first thread handedness;
a second fastener component having a second head portion, a second cylindrical body portion extending from the second head portion along a second cylindrical axis, a through hole formed through the second head portion and the second cylindrical body portion along the second cylindrical axis, a second thread formed on the second cylindrical body portion about the second cylindrical axis, the second thread having a second thread handedness opposite the first thread handedness, at least a part of the first cylindrical body portion of the first fastener being positioned within the through hole such that the first threads are situated within the through hole and the first cylindrical axis is substantially coaxial with the second cylindrical axis to form an axis of rotation; and
a rotating joint that captures the part of the first cylindrical body portion of the first fastener within the through hole of the second fastener component to limit substantial prohibit axial movement between the first fastener component and the second fastener component along the axis of rotation and permits axial rotation between the first fastener component and the second fastener component about the axis of rotation;
wherein the first fastener component is configured to be rotated in a first rotational direction about the axis of rotation and simultaneously the second fastener component is configured to be rotated in a second rotational direction about the axis of rotation, the second rotational direction being opposite the first rotational direction.

2. The fastener of claim 1 wherein the first head portion of the first fastener component includes a first screw drive and the second head portion of the second fastener component includes a second screw drive.

3. The fastener of claim 2, wherein the first head portion is configured to be engaged by the first screw drive to rotate the first fastener component in the first rotational direction and the second head portion is configured to be engaged by the second screw drive to rotate the second fastener component in the second rotational direction.

4. The fastener of claim 2, wherein the first screw drive is configured to be engaged by a first driver portion of a screwdriver tool to rotate the first fastener component in the first rotational direction about the axis of rotation and the second screw drive is configured to be engaged by a second driver portion of the screwdriver tool to rotate the second fastener component in the first rotational direction about the axis of rotation.

5. The fastener of claim 1, wherein the first fastener component is configured to be rotated at a first rotational speed in the first rotational direction by a first torque applied by the first driver portion of the screw driver tool; the second fastener component is configured to be rotated at a second rotational speed in the second rotational direction by a second torque applied by the second driver portion of the screw driver tool, wherein the first driver portion of the screw driver tool is coupled to the second driver portion of the screw driver tool through a gear train such that a single torque input provides the first torque and the second torque.

6. The fastener of claim 5, wherein a first magnitude of the first rotational speed is different than a second magnitude of the second rotational speed.

7. The fastener of claim 1, wherein the rotating joint comprises an annular flange having an edge portion inserted within an annular groove, permitting relative rotation between the annular flange and the annular groove.

8. The fastener of claim 1, wherein the annular flange is formed on an outer surface of the first fastener component and the annular groove is formed into a wall surface of the through hole of the second fastener component.

9. The fastener of claim 1, wherein the annular groove is formed into an outer surface of the first fastener component and the annular flange is formed on a wall surface of the through hole of the second fastener component.

10. The fastener of claim 1, wherein the first thread is formed on an outer surface of the first fastener component and the second thread is formed on a wall surface of the through hole of the second fastener component.

11. The fastener of claim 1, wherein the first thread is formed on an outer surface of the first fastener component and the second thread is formed on an outer wall surface of the second cylindrical body portion of the second fastener component.

12. The fastener of claim 1, wherein a first rotational speed of the first fastener component is configured to be different than a second rotational speed of the second fastener component when being simultaneously threaded to a mating component.

13. The fastener of claim 1, wherein a first lead distance of the first thread of the first fastener component is different than a second lead distance of the second thread of the second fastener component, and wherein a first rotational speed of the first fastener component is configured to be different than a second rotational speed of the second fastener component when being simultaneously threaded to a mating component, such that a first axial advance distance of the first fastener component is substantially equal to a second axial advance distance of the second fastener component.

14. The fastener of claim 1, wherein the first head portion of the first fastener component includes a first screw drive and the second head portion of the second fastener component includes a second screw drive, the first screw drive is configured to be engaged by a first driver portion of a screw driver tool to rotate the first fastener component in the first rotational direction about the axis of rotation and the second screw drive is configured to be engaged by a second driver portion of the screw driver tool to rotate the second fastener component in the second rotational direction about the axis of rotation, wherein the first driver portion of the screw driver tool is coupled to the second driver portion of the screw driver tool through a gear train such that a single torque input provides a first torque to the first screw drive and a second torque to the second screw drive.

15. The fastener of claim 1, wherein a first lead distance of the first thread is the same as a second lead distance of the second thread.

16. The fastener of claim 1, wherein an axial play distance between the first fastener component and the second fastener component is limited by the rotating joint to less than one fourth of a first thread pitch of the first thread, or less than one half of the first thread pitch of the first thread, or less than three fourths of the first thread pitch of the first thread, or less than one of the first thread pitch of the first thread.

17. A fastener comprising:
- a first fastener having a first cylindrical body portion extending along a first cylindrical axis and a first thread formed on an outer surface of the first cylindrical body portion;
- a second fastener having a second cylindrical body portion extending along a second cylindrical axis, a through hole formed through the second cylindrical body portion along the second cylindrical axis, a second thread formed on the second cylindrical body portion about the second cylindrical axis; and
- a rotating joint that captures at least a part of the first cylindrical body portion of the first fastener within the through hole of the second fastener component such that the first threads are situated within the through hole and the first cylindrical axis is substantially coaxial with the second cylindrical axis to form an axis of rotation, the rotating joint limits substantial axial movement between the first fastener component and the second fastener component along the axis of rotation, the rotating joint permits axial rotation between the first fastener component and the second fastener component about the axis of rotation;
- wherein an axial play distance between the first fastener and the second fastener is limited by the rotating joint to less than a first thread pitch of the first thread.

18. The fastener of claim 17, wherein the first thread is configured with a first thread handedness and the second thread is configured with a second thread handedness opposite the first thread handedness, the first fastener is configured to be rotated in a first rotational direction about the axis of rotation and simultaneously the second fastener is configured to be rotated in a second rotational direction about the axis of rotation, the second rotational direction being opposite the first rotational direction.

19. A method of driving a threaded fastener comprising:
- providing a first threaded fastener positioned within an axial through hole of a second threaded fastener, the first threaded fastener being coupled to the second threaded fastener through a rotating joint configured to limit substantial axial movement between the first fastener component and the second fastener component along a common axis of rotation, the rotating joint configured to permit axial rotation between the first fastener component and the second fastener component about the common axis of rotation; and
- applying, simultaneously, a first torque to the first threaded fastener configured to rotate the first threaded fastener in a first rotational direction about a common thread axis and a second torque to the second threaded fastener configured to rotate the second threaded fastener in a second rotational direction about the common thread axis, wherein the common thread axis is substantially colinear the common axis of rotation.

20. The method of claim 19 further comprising: providing a screw driver tool with a first driver portion and a second driver portion wherein the first driver portion of the screw driver tool is coupled to the second driver portion of the screw driver tool through a gear train such that a single torque input provides the first torque and the second torque, wherein the gear train is configured to rotate the first driver portion in the first rotational direction and rotate the second driver portion in the second rotational direction opposite the first rotational direction.

\* \* \* \* \*